United States Patent

[11] 3,599,285

| [72] | Inventor | William F. Hamilton<br>Houston, Tex. |
|---|---|---|
| [21] | Appl. No. | 766,597 |
| [22] | Filed | Oct. 10, 1968 |
| [45] | Patented | Aug. 17, 1971 |
| [73] | Assignee | Myron & Mallay d/b/a Mallay Tool Service<br>Houston, Tex. |

[54] PELLETIZING DIE PLATE
7 Claims, 14 Drawing Figs.

[52] U.S. Cl. .................................................. 18/12 A,
18/1 B, 146/188
[51] Int. Cl. ..................................................... B29f
[50] Field of Search ........................................... 18/1 B, 1 E,
12 A; 146/186, 188

[56] References Cited
UNITED STATES PATENTS

| 3,114,169 | 12/1963 | Palmer ........................ | 18/12 |
| 3,287,764 | 11/1966 | Swickard ..................... | 18/12 |
| 3,308,507 | 3/1967 | Black ........................... | 18/12 |
| 3,349,433 | 10/1967 | Schippers .................... | 18/12 |
| 3,427,685 | 2/1969 | Gove ............................ | 18/12 |
| 3,452,394 | 7/1969 | McNeal ........................ | 18/12 |
| 3,271,822 | 9/1966 | Rhino ........................... | 18/12 |

*Primary Examiner*—J. Spencer Overholser
*Assistant Examiner*—Ben D. Tobor
*Attorney*—Robert W. B. Dickerson

ABSTRACT: A pelletizing die plate and wherein a relatively small area of nozzle discharge end face metal around nozzle discharge openings is traversed by knives revolved to sever plastic pellets extruded through the nozzle bores. At the same time the knives traverse a substantially greater area of backing surface of harder, more brittle, carbide, ceramic or harder metal material over the discharge face around the softer metal annuli around the extrusion bores. Thus the extrusion bores, formed through the relatively softer and more uniformly workable metal, can be of uniformity to insure the extrusion of pellets of uniformity as they are cooled and cut off at the discharge ends of the aforesaid uniform extrusion bores.

PATENTED AUG 17 1971
3,599,285
SHEET 1 OF 2
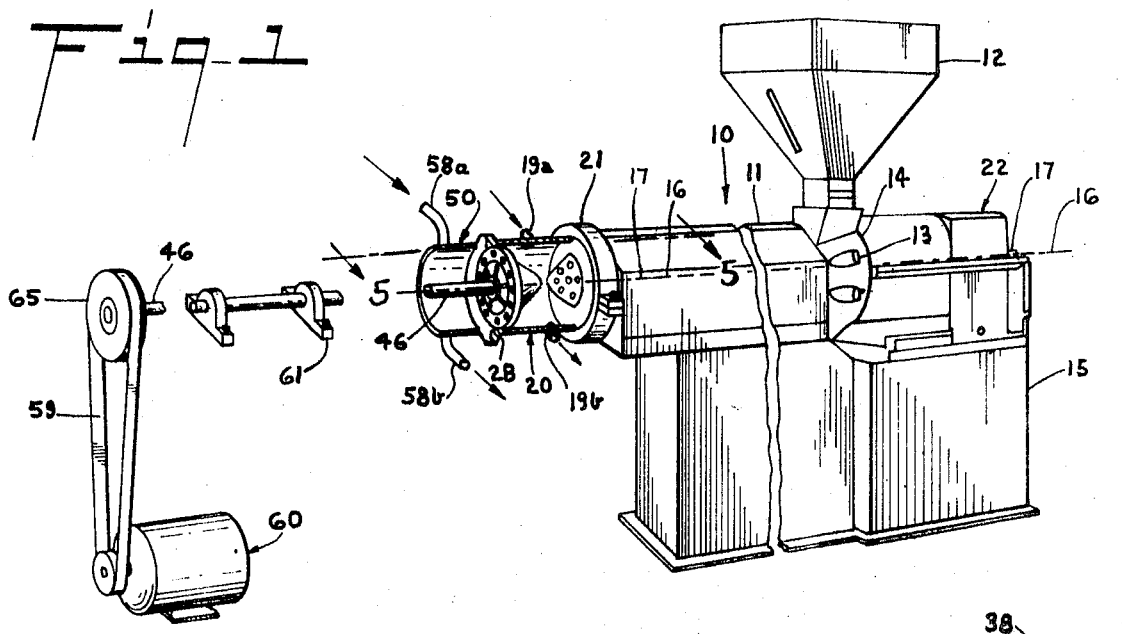
Fig. 1
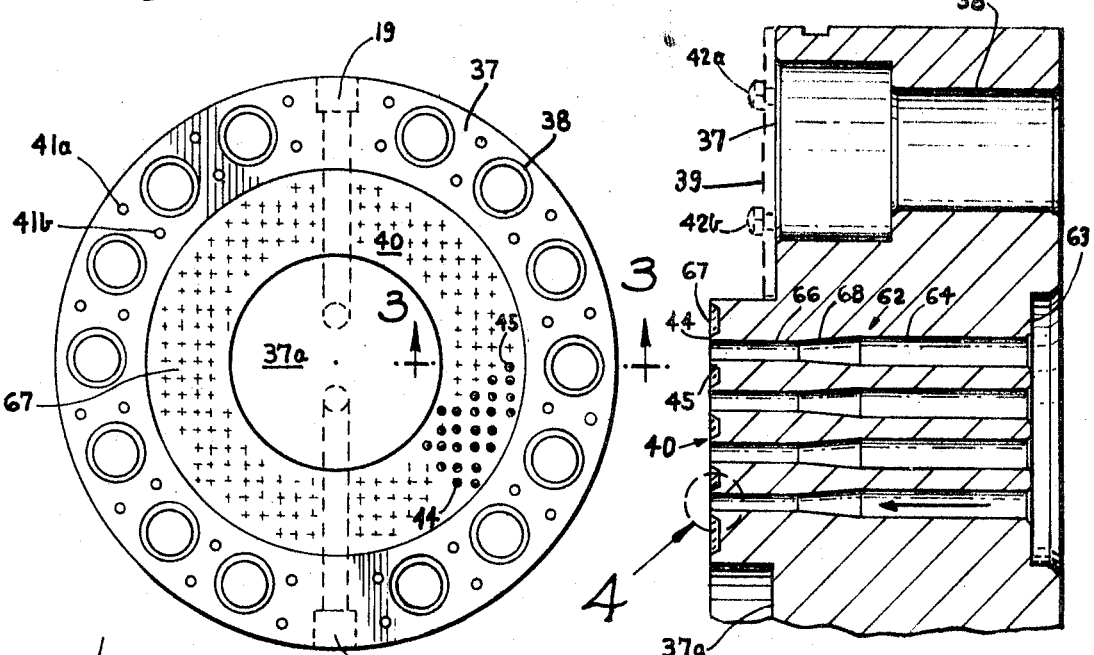
Fig. 2
Fig. 3
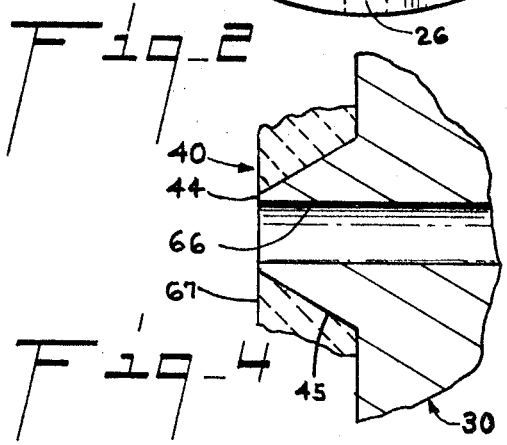
Fig. 4
WILLIAM F. HAMILTON
INVENTOR
BY Wm. E. Ford
ATTORNEY

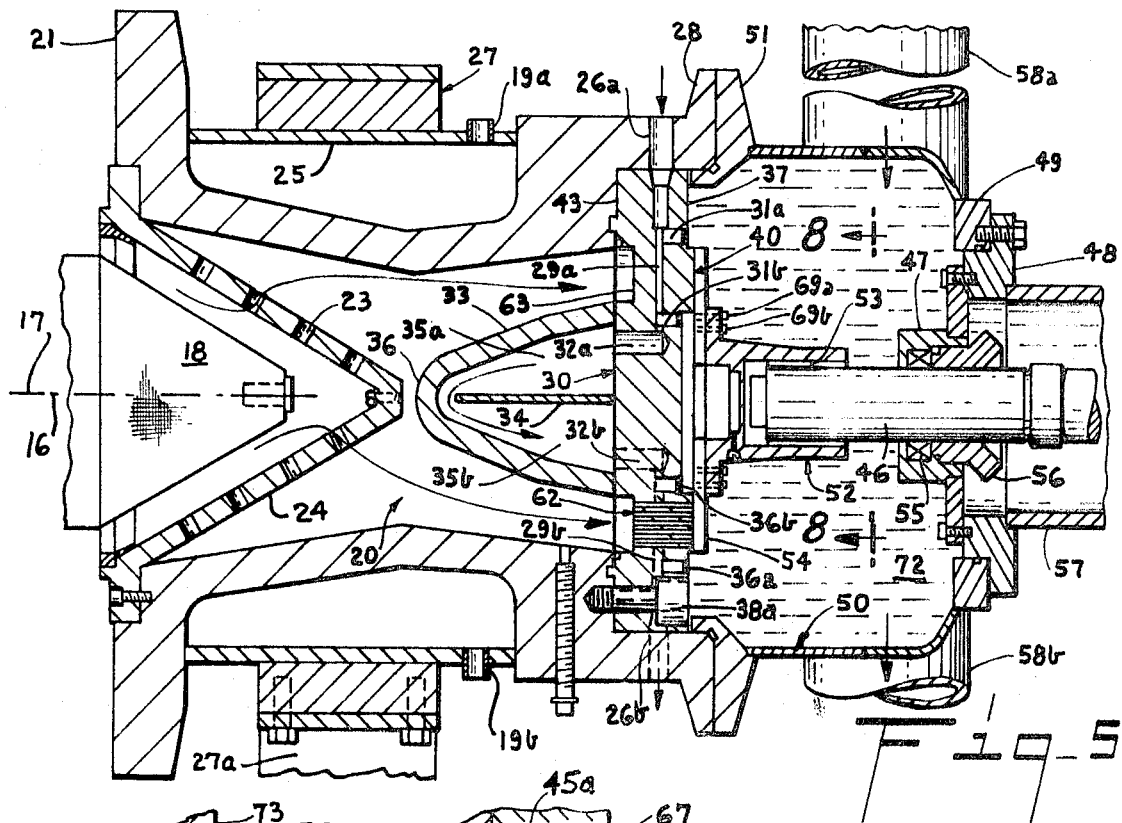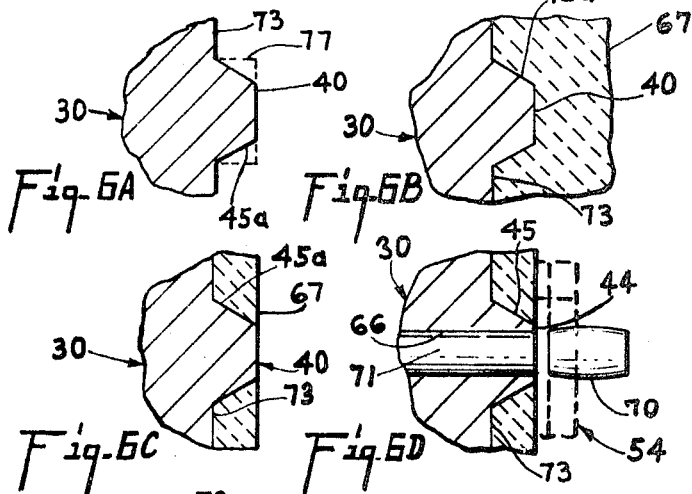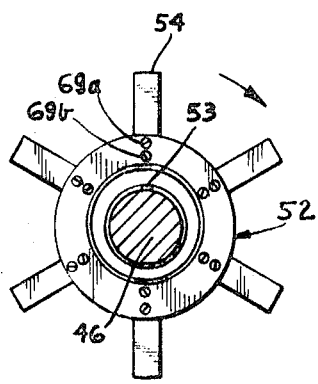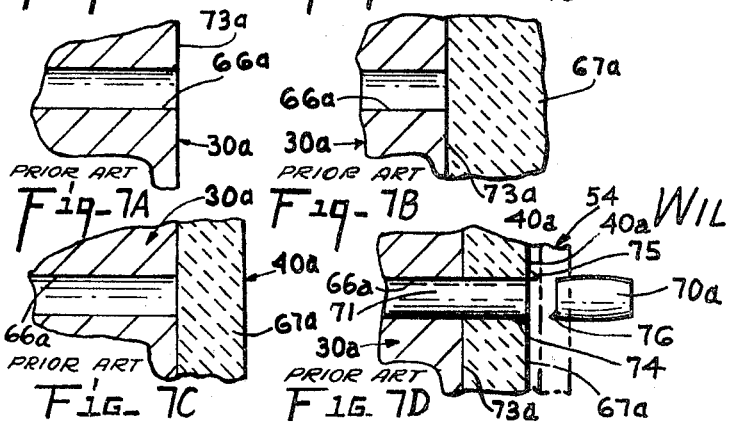

PELLETIZING DIE PLATE

The invention relates to a pelletizing die plate with the relatively softer, more uniformly workable metal of discharge nozzles extending flush with the die plate discharge face to be traversed by pellet severance knives as the pellets extruded through the nozzle bores are water cooled and severed by revolved knives, which traverse substantially greater areas of backing material, as ceramics, carbide or harder metal.

As a primary object the invention sets out to provide a pelletizing die plate with the softer, more accurately workable metal of the die plate extending, as discharge nozzle end faces, in the plane of discharge and flush with the harder, more brittle, and less easily worked material, as carbide, ceramics, or harder metal, which surrounds and backs up the nozzle metal.

It is also another and important object of the invention to provide a pelletizing die plate of this class which has extrusion passages formed exclusively through relatively softer, more workable metal, with the discharge ends of the extrusion bores falling in the discharge plane of the die plate and flush with the backing material therearound, whereby the pellets that are formed, to be severed by knives revolved in cooling water, are of substantially perfect uniformity, whereby the pellets, when transported for use, may be measured with accuracy by volume.

The invention also has the important object of providing pellets of substantially perfect uniformity as extruded through uniformly fabricated extrusion bores in relatively soft, uniformly workable, die plate metal in manner that the end faces of the extrusion nozzles fall substantially flush with the harder material backing the nozzles on the discharge face of the die plate.

Other and further objects will be apparent when the specification hereinbelow is considered in connection with the drawings, in which:

FIG. 1 is an isometric view of a typical machine for processing granular plastic, and for extruding it into pellet form as cooled by water at the end of extrusion through a die plate comprising an embodiment of the invention;

FIG. 2 is an enlarged view of the extrusion face of the die plate shown to small scale in FIG. 1;

FIG. 3 is an enlarged, fragmentary, sectional elevational view, taken along line 3-3 of FIG. 2, showing detail of die plate, plastic extrusion passages and discharge nozzle configuration;

FIG. 4 is an enlarged, fragmentary, sectional elevational view through one of the die plate discharge nozzles shown in FIG. 3;

FIG. 5 is an enlarged, fragmentary, sectional elevational view taken along line 5-5 of FIG. 1 showing details of processed plastic header chamber and of pellet cooling and separation chamber, including pellet separation knives and die plate;

FIG. 6A is an enlarged fragmentary view through a die plate discharge nozzle of this invention in first stage of fabrication;

FIG. 6B is an enlarged fragmentary view showing the discharge nozzle introduced in FIGS. 3, 4 and 6A in second stage of fabrication, the die plate discharge face being covered with a ceramic, hard metal, or cement facing;

FIG. 6C is an enlarged fragmentary view showing the discharge nozzle introduced in FIGS. 3, 4 and 6A in third state of fabrication, the die plate facing material having been ground off or machined down in thickness until it is flush with the discharge nozzle and face;

FIG. 6D is an enlarged fragmentary view showing the discharge nozzle introduced in FIGS. 3, 4 and 6A after fourth stage of fabrication, the extrusion passage having been drilled through the discharge nozzle to communicate with the interior of the pellet separation and cooling chamber; and processed plastic having been extruded through the extrusion passage, and the pellet severance knives having severed a pellet as cooled by cooling water contact;

FIG. 7A is an enlarged fragmentary view through a die plate to be fabricated after conventional methods, with a plastic extrusion passage having been drilled therethrough as a first step;

FIG. 7B is an enlarged fragmentary view of the die plate portion introduced in FIG. 7A in second stage of fabrication; the discharge face being covered with a ceramic, hard metal, or carbide facing;

FIG. 7C is an enlarged fragmentary view showing the die plate portion introduced in FIG. 7A in third stage of fabrication, the die plate facing material having been ground off or machined down to a predetermined thickness;

FIG. 7D is an enlarged fragmentary view showing the die plate portion introduced in FIG. 7A after fourth stage of fabrication, the extrusion passage having been continued on through the ceramic, hard metal or carbide facing to communicate with the interior of the pellet separation and cooling chamber; processed plastic having been extruded through the extrusion passage, and the pellet severance knives having severed an objectionably shaped pellet, as cooled by cooling water contact; and FIG. 8 is a transverse elevational view, taken along line 8-8 of FIG. 5, showing pellet severance knife mountings.

Referring now in detail to the drawings, in which like reference numerals are applied to like elements in the various views, a plastics processing and pelletizing machine 10 is shown in FIG. 1 which receives plastic in granular form into a hopper 12 and processes it in the machine process body 11 where it may have ingredients added thereto, and where it may undergo change of chemical and/or physical nature.

In the body 11 of the machine, the granular plastics is processed and maintained under heat, heater elements 13 being indicated around the plastics inlet 14, as part of the means for applying heat. The machine 10 is supported on a stand or support frame 15 which elevates the delivery axis 16 to a predetermined best operative level.

A shaft 17, coincident with the machine axis 16, is longitudinally adjustable, by conventional adjustment means, not shown, to dispose a screwhead 18, FIG. 5, in relation to a perforated, conically shaped, perforate shield 24 mounted in the rear flange 21 of the processed plastics header chamber 20. The shaft 17 extends rearwardly, past the inlet 14, and is driven at its rear end, through a motor-reduction gear transmission unit 22, FIG. 1. The plastics is processed under heat in the body 11, as aforesaid, and the processing may produce chemical and/or physical change in the plastics, as ingredients may be added.

The screwhead 18, on the forward end of the revolved shaft 17, urges the molten plastics through the perforations 23 in the perforate shield cone 24, the processed plastics header chamber 20 being surrounded by a steam jacket 25 having steam inlet 19 and steam outlet 19b. Also, a support yoke 27 surrounds the steam jacket 25 to support the plastics header 20, the yoke 27 being in turn supported by a stand 27a to dispose the shield cone 24 and axis of the header chamber 20 in coaxial alignment with the shaft 17. The forward flange 28 of the header chamber 20 is recessed to receive a die plate 30 therein which comprises the novel structure involved in this invention.

Steam enters into the wall of the plastics header chamber 20 by way of a steam inlet 26a which communicates with an inlet channel 29a into the die plate 30. The channel 29a in turn communicates within the die plate 30 with an outer annular groove 31a and an inner annular groove 31b. Thence the steam passes from the inlet channel 29a via an upper rear port 32a, into a conical deflector 33 which extends rearwardly from the rear face of the die plate 30. The deflector cone 33 is divided by a horizontally disposed baffle 34 into an upper chamber 35a and lower chamber 35b, the baffle 34 ending short of the interior of the cone apex 36, thus to leave a passageway between the chambers 35a, 35b. From the lower chamber 35b the steam may pass back into the die plate 30 through a lower rear port 32b to an outlet channel 29b which communicates with the annular grooves 31a, 31b, and then passes outwardly through the lowermost part of the die plate 30 to connect with steam outlet 26b through the wall of the plastics header chamber 20. The annular grooves 31a, 31b are closed on the forward side of the die plate 30 by means of closure rings 36a, 36b, indicated diagrammatically in black in FIG. 5.

The forward face of the die plate 30 is turned down to an outer annular ring 37 having bolt holes 38 equally angularly spaced apart therearound interposed between radially spaced-apart pairs of holes 41a, 41b. Also the forward face of the die plate 30 is bored centrally to a face 37a, thus leaving an annular, raised face 40 therebetween. Assembly bolts 42a, 42b, are passed through matching holes in an annular cover plate 39 and into the respective holes 41a, 41b in the annular ring surface 37 of the die plate 30. The annular cover plate 39, FIG. 2, thus may cover bolts 38a FIG. 5, in the bolt holes 39, which assemble the die plate 30 to the counterbored face 43 of the forward flange 28 of the processed plastics header chamber 20.

The raised face 40 of the die plate 30 comprises the extruded plastics discharge face. Such face 40 lies in the plane of discharge, and thus the outer faces of discharge nozzles 45 comprise small annular rings 44 of metal which extend in the aforesaid plane of discharge, as will be further described.

A shaft 46 extends through a stuffing box 47 carried by a closure plate 48 mounted on the forward end 49 of the pellet cooling and separation chamber 50 with which the die plate forward face 40 communicates; the chamber 50 having a rear flange 51 which connects with the forward flange 28 of the processed plastics header chamber 20. A mounting flange 52 is keyed to the rear end of the shaft 46 by keys 53, and a series of knives 54, equally angularly spaced apart from the center of the shaft 46, are mounted by machine screws 69a, 69b on the rear face of the mounting flange 52 in manner that their cutting edges may be revolved in the plane of discharge of extruded plastics from the nozzles 45, or with substantially minimum clearance over the die plate discharge face 44. A cooling water inlet 58a carries circulating cooling water into the pellet separation and cooling chamber 50, and an outlet 58b carries the water away therefrom.

The shaft 46 is shown extending rearwardly through a packing 55 in the stuffing box 47, as compressed by a packing nut 56 around the shaft 46 and within a housing 57, which may be the housing of a machine or process apparatus which follows sequence of sequence of processing, as indicated in FIG. 5. In any event the drive for the knives 54 is shown diagrammatically in FIG. 1 as originating at a motor 60, which is connected by a drive belt 59 to drive a pulley 65 on the forward end of the shaft 46 forward of supporting pillow blocks 61 which are in turn supported forwardly of the housing 57, FIG. 5.

The extrusion passages 62 through the die plate 30 are of conventional design and extend forwardly from an annular groove 63 in the rear face of the die plate 30, first as bores 64, then as tapered bores or frustoconically shaped spaces 68, to reduced diameter discharge passages or bores 66 which terminate forwardly in the forward faces 44 of the nozzles 45. Such nozzles 45 are shown in FIG. 3 as being in the shape of small frustocones which are shown in FIGS. 3 and 4 as being surrounded by a carbide facing 67 which fills all of the interspace between the nozzles 45 and the plane of discharge which includes the annular discharge faces 44 of the nozzle metal. The carbide facing 67 serves as a backing support for the discharge nozzles and should be preferably of a harder, wear resistant and very rigid material, ceramics also serving for this purpose, and also some of the harder metals such as hardened material of ferric content, harder than those metals best adapted for the smoothest machining. The discharge plate discharge plane facing, being of such hard materials, also is generally of some associated brittleness but any tendency of the facing to break off or sliver or shatter, in degree, is remedied by the knives 54 taking off such splinters or protuberances in initial adjustment. After that, in service, the knives rotate over a smoothed facing with a minimum, but requisite clearance from the facing material, and also with such minimum clearance being more easily established with relation to the annular discharge faces 44 of the softer metal nozzles 45. Thus, as the extruded plastics passes from the nozzle discharge bores or passages 66 to form pellets, as cooled, the knives 54 rotate against the pellets to sever them from the plastics in the aforesaid discharge bores 66. Since these bores, through relatively soft, smoothly workable metal, are of uniformity, the pellets 70 are of uniform size and shape, as extruded.

FIGS. 6A, 6B, 6C and 6D set forth the successive method steps by which the die plate discharge face 40 is fabricated by comparison with the method steps, FIGS. 7A, 7B, 7C and 7D by which the discharge face of a conventional die plate for comparable usage is formed. First, the nozzles 45a are formed, FIG. 6A, by milling the surface 40 down to the surface 73 around the aforesaid nozzles, the metal of the die plate 30 being a comparably softer and more positively workable metal than the material which completes the die plate to the plane of discharge. Then a supporting, backing, or face completing material 67, as carbide, ceramics, or a comparatively harder metal, is applied, FIG. 6B, to the discharge face 40. Then, the excess of the material 67 is machined off until flush, FIG. 6C, with the nozzle faces 44a.

Finally the extrusion passages 62, FIGS. 3 and 5, are formed through the die plate 30, including the discharge bores 66 which pass centrally through the nozzle stocks 45a, FIG. 6C, to complete the nozzles 45, FIG. 6D, so that the small, annular, end face area 44 around each bore 66 falls in the plane of discharge 40. As the discharge bores 66 thus extend entirely through the comparatively softer steel of the die plate 30, which can be worked with uniformity and accuracy, and without chipping off, or slivering, there results most uniform discharge bores 66 through which the processed plastics 71 may be extruded to form pellets, as jelled by cooling water contact. As the pellets jell or form the end of the bores 66, the knives 54, FIG. 5 and FIG. 8, revolved over the discharge face 40, through the cooling water 72, knock off the jelled or formed pellets 70, the speed of the knives being synchronized, by empiricism, with the formation of the pellets 70.

By contrast, the steps of forming the discharge face of a pelletizing die plate of conventional type may be compared with the invention herein, FIGS. 7A, 7B, 7C and 7D being considered. FIG. 7A shows a die plate 30a, of relatively softer, workable metal through which the extrusion bores including discharge bores 66a have been formed through to the face 73a. As a second step, FIG. 7B, a carbide, ceramic, or harder metal material 67a has been affixed to extend over the metal face 73a. Then, the material 67a has been machined down to a predetermined thickness over the metal face 73a to provide a discharge face 40a in the plane of discharge. Finally the discharge bore 66a has been extended on through the facing material 67a. As characteristically may happen a chip has been removed from the bore 66a in the course of drilling through the hard, brittle material 67a, thus to leave an irregular space 74 in communication with, or forming a part of the bore 66a adjacent its discharge end. Also, a chip, sliver, or shaving 75 has been left or formed, as shown in FIG. 7D, as the bore 66a has advanced through the discharge face 40a. When the processed plastics 71 is admitted to the extrusion passages to pass out the discharge bores 66a, any space, as the space 74 in a bore can result in a pellet 70a with a tail or irregular extension 76 being formed in such space 74. Then as the knives 54, in their rotation, cut off the water cooled, jelled pellets 70a, they carry the irregularly shaped tail 76 as an extension part. Also, any slivers or projections 75 that may project from the material 67a comprising the discharge face 40a will be carried away as shorn off by the knives 54, thus to add detritus, foreign matter, or very off size particles to detract from the uniformity of the mass of pellets 70a, when recovered from the pellet chamber 50, through access door, not shown.

Limitations of construction of nozzles and limitations desired in pellet size and in discharge bore diameter can place a limit on the range of backing surface or facing area percentages traversed by the knives 54 as compared with the annular areas 44 of softer metal or nozzle discharge faces traversed by the knives. Workable discharge diameter 66 may range from approximately 0.05 inches to say approximately 0.87 inches, with the radial width of the metal end annuli being generally 0.02 inches greater in diameter than the diameter of the discharge bores. Also, as to depth of facing material 67, this may range from say 0.02 inches to 0.08 inches. The area required for each nozzle base and the interspace therearound can range from approximately 0.03 square inches up to approximately 0.6 square inches for sizes of greatest discharge bores 66. As to the relative discharge areas traversed, the percentage of soft metal or discharge nozzle annuli area can range from percentages as low as 0.5 percent up to say approximately 4 percent against respective complemental percentages of 99.5 percent to 96 percent of harder, nozzle surrounding material traversed by the knives.

As to nozzle shape the frustoconical form shown generally in the drawings is not the only shape that may serve as nozzle form, but other forms as squares, cylinders, and the like may define the nozzles. Note the dotted line form 77 around the nozzle 45a in FIG. 6A. In effect the invention sets out to provide discharge bores through workable material that can insure uniformity of bore with consequent uniformity of extruded pellet form.

The invention is thus not limited to the structures of die plate discharge face hereinabove described but considers other forms as well, it being the guiding principles of the invention to provide die plate forms and methods of construction which will insure that the knives sever uniformly shaped, smooth pellets, of uniform size, with no irregularities, for which the knives are sized and regulated as to speed of rotation to sever such pellets in a timely order as they jell. The appended claims, together with the drawings and the specification hereinabove thus complete this application as its spirit merits.

I claim:

1. For mounting in a plastics processing and pelletizing machine between a flowable plastics header chamber and a pellet cooling ans separation chamber, a die plate body providing radially and angularly spaced-apart extrusion passageways therethrough to pass processed plastics from said header chamber into said cooling and separation chamber, said die plate providing means to distribute heat around said passageways, said passageways having nozzles formed from the material of said die plate body therearound to provide small annular discharge face areas in the discharge plane of the die plate, said die plate body being recessed around said nozzles, and a facing material of greater hardness than said die plate body and nozzle material positioned in said recesses filling in the interspace between nozzles on the discharge side of said die plate, but not communicating with said passageways, and up to, and substantially planar with said discharge plane and said discharge face areas of said nozzles, whereby said passageways through said nozzles provide smooth passages for uniform extrusion of plastics therethrough to form pellets of uniform size as cooled and to be sheared off by knife means rotatably mounted in said pellet cooling and separation chamber.

2. A die plate as claimed in claim 1, in which said facing material comprises a carbide material.

3. A die plate as claimed in claim 1, in which said facing material comprises a ceramic material.

4. A die plate as claimed in claim 1 in which said facing material comprises a hardened metal of ferric content.

5. A die plate as claimed in claim 1 in which said die plate provides, as heat distribution means, steam passage means therethrough for the passage of steam to keep the die plate heated, including around said extrusion passageways.

6. A die plate as claimed in claim 1 in which the said annular discharge face areas of the nozzles bear ratios to facing material areas in plane of discharge ranging from substantially 0.5 percent to substantially 4 percent as complemented by ratios of from substantially 99.5 percent to substantially 96 percent.

7. A die plate as claimed in claim 1 in which the rate of uniform extrusion of plastics through the die plate is correlated with the rate of severance knife rotation and coolness of circulated water through the said pellet cooling and separation chamber.